United States Patent [19]

Hawkins

[11] Patent Number: 5,761,645
[45] Date of Patent: Jun. 2, 1998

[54] SYSTEM AND METHOD FOR INSURANCE GIFT PAYMENTS

[75] Inventor: William K. Hawkins, Austin, Tex.

[73] Assignee: Equitable Life & Casualty Insurance Co., Salt Lake City, Utah

[21] Appl. No.: 576,810

[22] Filed: Dec. 21, 1995

[51] Int. Cl.[6] ................................................ G06F 19/00
[52] U.S. Cl. .................................................... 705/4
[58] Field of Search ............................ 395/201, 204, 395/236

[56] References Cited

PUBLICATIONS

Black's Law Dictionary, Abridged Fifth Edition, pp. 46,47, 782–789, Dec. 1983.
Conway, Margaret; Life Insurance Trusts; CPA Journal, v64, pp. 38–42, Sep. 1994.
"Microsoft Schedule+ Integrates Mail and Time Management", Microsoft Press Release, May 6, 1991.
R.I. Mehr, et al., *Principles of Insurance*, Seventh Edition 1980, pp. 358–401.
K. Black, Jr., et al. *Life Insurance*, Eleventh Edition, 1987; Chapter 9, pp. 139–158.

*Primary Examiner*—Gail O. Hayes
*Assistant Examiner*—Thanh-Hang Voqui
*Attorney, Agent, or Firm*—Trask, Britt & Rossa

[57] ABSTRACT

Upon the death of an insured, a system releases gift payments to designated beneficiaries on designated dates over a period of years (e.g. ten years.) As part of the policy, the insured may select a message to be sent to the beneficiaries with the gift payments. In a preferred embodiment, the user selects the amount of gift payments, which must be divisible by $25. In a preferred embodiment, 1 unit=$100 in gift payments for 10 years. The insurer develops a premium table or other mechanism to designate a premium for each unit based on the age and sex of the insured. The insured provides the insurer with name and address of the beneficiaries, the date on which payment is to be made, and the amount. This information is stored in a data base. Prior to the insured's death, the insured's account is in living status. While in living status, a computer determines that premiums are paid, if any are due. Once the insured dies, insured's account is updated to a deceased status. No further premiums are due, and payments begin on the designated dates for the number of years specified in the policy. Different beneficiaries may have different designated dates and amounts.

25 Claims, 1 Drawing Sheet

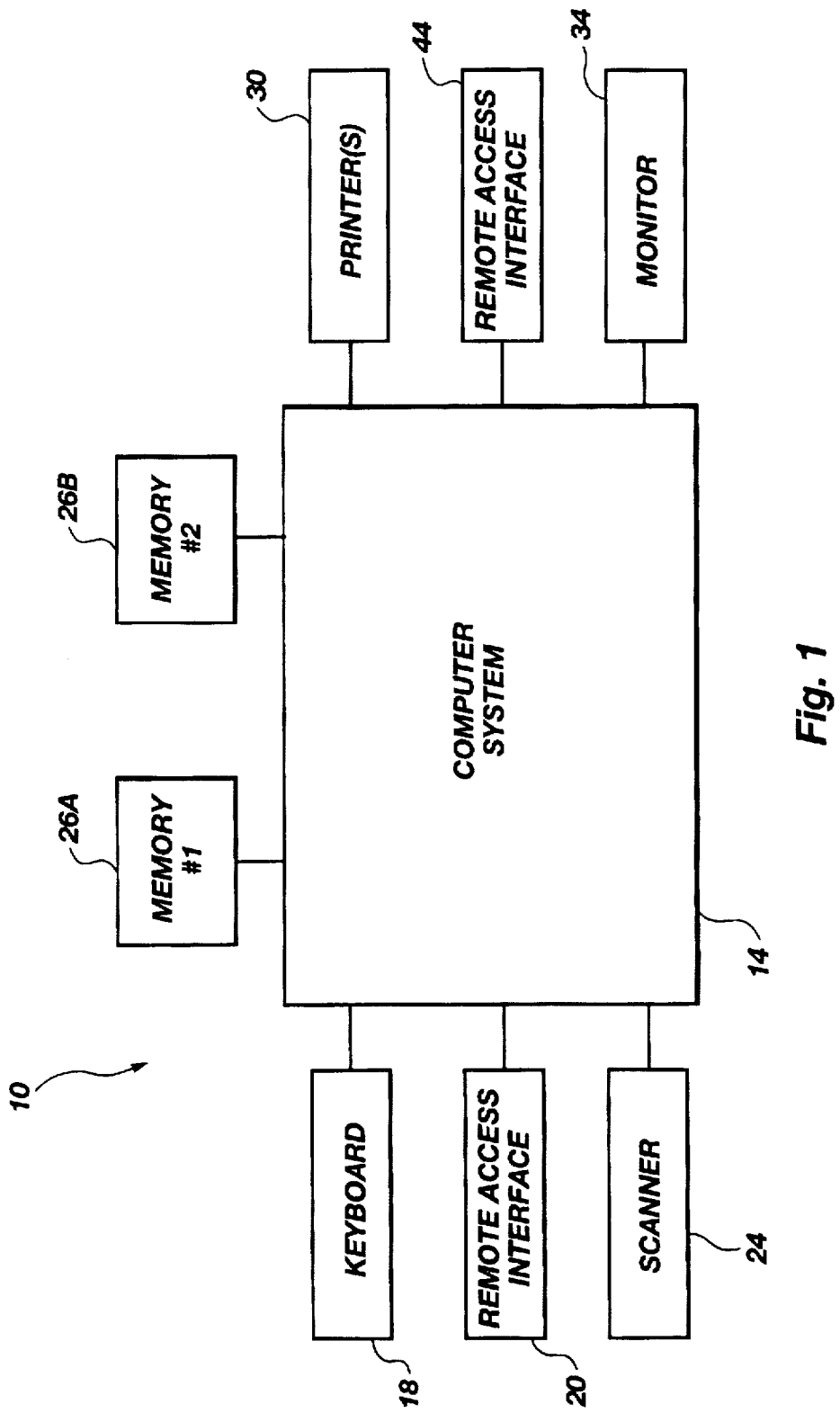

SYSTEM AND METHOD FOR INSURANCE GIFT PAYMENTS

BACKGROUND OF THE INVENTION

1. Field of the Invention

The present invention relates to a system and method for providing insurance gift payments along with a message to designated beneficiaries on designated dates over a period of years.

2. State of the Art

Traditionally, life insurance is an agreement between an insured and an insurance company that the insurance company will pay one or more designated beneficiaries a particular amount of money upon the death of the insured.

The insured makes payments called premiums either in one lump sum amount or over a period of time. In a whole life insurance policy, the insurance coverage period lasts until the insured dies, as long as certain conditions are met. In a term insurance policy, the insurance coverage period lasts a predetermined amount of time, typically one year.

Various settlement options have been available including a cash or lump sum option, an interest option, a fixed-period option, or a fixed-amount option. These and other options are described in Black et al., *Life Insurance*, Eleventh Ed., 1987, Prentice Hall, Englewood Cliffs, N.J., pp. 147–151.

SUMMARY OF THE INVENTION

Upon the death of an insured, an insurer pays designated beneficiaries gift payments on designated days over a period of years (e.g. ten years.) As part of the policy, the insured may select a message to be sent to the beneficiaries with the gift payments.

In a preferred embodiment, the user selects the amount of gift payments, which must be divisible by $25 without remainder. In a preferred embodiment, 1 unit=$100 in gift payments for 10 years. However, divisibility without remainder and the use of units are not necessary.

The insurer uses a premium table or other mechanism to designate a premium based on the age and sex of the insured. Each insurer may want to develop its own set of premiums.

The insured provides the insurer with name and address of the beneficiaries, the date on which payment is to be made, and the amount. This information is stored in a database. There is also information about the insured, such as the insured's name and address. Prior to the insured's death, the insured's account is in living status. While in living status, a computer determines that premiums are paid, if any are due.

Once the insured dies, insured's account is updated to a deceased status. No further premiums are due, and payments begin on the designated dates for the number of years specified in the policy. Different beneficiaries may have different designated dates and amounts.

Under one embodiment of the invention, the insured provides information regarding the relationship of each beneficiary to the insured and the occasion (if any) of the designated date. The insured then selects a message appropriate to the occasion to be sent to the beneficiaries along with a check for the gift payment.

Under another embodiment of the invention, the insured chooses among several messages offered by the insurer. Under still another embodiment of the invention, the insured provides a creative message to be sent with the gift payments.

The messages may be, for example, a card, letter, or electronic transmission. Likewise, the gift payment may be made through mail or other delivery, or electronically with the message.

Under one embodiment of the invention, the designated date may be either a particular day of the year (such as a birthday) which falls on the same date each year, or an occasion (such as Thanksgiving) that falls on a different date each year. Under a more simplified embodiment of the invention, only specific dates may be chosen. In that case, a Thanksgiving message and gift payment would be sent so as to arrive on the earliest possible date for Thanksgiving.

The insured could make audio or audio/visual messages that could be mailed or electronically transmitted along with the gift payment.

Various other aspects of the invention are described below.

The claims as originally filed or later added define the scope of the invention.

BRIEF DESCRIPTION OF THE DRAWINGS

FIG. 1 shows a block diagram representation of computer system for implementing some aspects of the present invention.

DETAILED DESCRIPTION OF PREFERRED EMBODIMENTS

A. System and Method Overview

The present invention involves preparing a check and a message for sending to beneficiaries at predetermined dates over a period of years.

There is a strong desire in people to want to be remembered by loved ones after death. For example, there is a powerful need among grandparents to believe that after they have passed on they will be remembered affectionately by their grandchildren and continue to have an influence on them. The present invention has tremendous value because it provides a powerful and effective way to help surviving loved ones remember grandparents or others and to continue to be influenced by them after their death. Also, the invention provides the insured with satisfaction before their death by knowing that the insurer will send a gift payment and a message at the designated dates.

Referring to FIG. 1, a system 10 includes a computer system 14 that derives various information through input means which may include one or more of a keyboard 18, a remote access interface 20 (which may be a modem), a scanner 22, and memory 26. Computer system 14 may be a standard well known microprocessor-based system adequate to handle a large volume of insured's accounts and the peripherals selected. Two memories, memory 26A and memory 26B, are shown to illustrate that more than one type of memory may be used. (Of course, more than two memories may be used.) Indeed, even beyond there being RAM and ROM, there may be a hard drive for rapid access and a more slowly accessed memory, such as CD rom or tape. Memory 26A and memory 26B are generally referred to as memory 26.

Memory 26 contains information regarding the name and address of each beneficiary who is to receive a gift payment, the designated date, the amount of gift payment, and a message to accompany the gift payment. The information may be provided to a printer(s) 30 and/or a monitor 34.

Printer(s) 30 may include a printer that prints one or more of checks, cards, letters, address labels, envelopes, and reports. Alternatively, multiple printers could be used to perform these tasks.

Under one embodiment of the invention, an employee of the insurer or an automatic envelope stuffer, merely places the check and card in the envelope and places it for mailing. Of course, computer system 14 preferably would anticipate enough time for mailing so that the beneficiary receives the gift payment and message prior to (or at least on the day of) the designated occasion.

Alternatively, computer 14 could access a remote location through remote access interface 44 (which could be a modem). Remote access interface 20 may replace and perform the functions of remote access interface 44.

Some of the information employed by computer system 14 is specific to the individual insured and beneficiaries. Other information and software or firmware programs are common to all insureds and beneficiaries. The common information and programs are preferably stored on a hard disk. Memory 26 may include specialized algorithms entered as PROMs (programmable read only memory).

Computer system 14 may send a request to insureds every so often (e.g. every 3 years) to verify or update addresses of beneficiaries. Also, under one embodiment of the invention, the insureds may change the beneficiaries at that or another time through notification of the insured, which information is then input into computer system 14.

B. Message

The insured may choose from a variety of messages that may be in the form of, for example, a card, letter, or electronic message. The text and form of a message may be chosen from a supply offered by the insurer or may be chosen by the insured.

A variety of designated occasions may be chosen. For example, designated dates may be a birthday, Christmas, Hanukkah, grandparents day, start of the school year, end of school year, only to name a few. The card chosen could be associated with the day chosen. For example, if the check were to arrive around the beginning of a school year (e.g. on August 1), the card could mention that the money was provided to help buy school clothes or pay for tuition.

At present, it is expected that mailing of the check and message is preferred for most insureds. However, transferring money and a message electronically, such as through the Internet, is within the scope of the invention. It is expected that within not too many years, electronic transfer of gift payments and messages will be preferred for many insureds.

The insured or insurer could make audio or audio/visual messages that could be sent (by mail or electronically) with the gift payment. This would become particularly practical as digital recording techniques become more cost effective.

C. The Amount of the Gift Payment

In a preferred embodiment, gift amounts are standardized to Units, where 1 Unit=$100 of annual gift amount. Fractional and multiple Units are available. For example:

¼ Unit=$25 per year for 10 years

1½ Units=$150 per year for 10 years

10 Units=$1,000 per year for 10 years

Accordingly, if an insured wanted to have three grandchildren receive $150 per year for 10 years, she would buy 4½ Units=(3×1 ½ Units).

In a preferred embodiment, a minimum policy size is ¼ Unit and a Maximum policy size is 10 Units, although higher limits are available with prior Home Office approval. A minimum modal premium is $10 direct bill and $5 bank draft. (The particular limits are provided only as examples and, of course, other limits could be set). The invention is not limited to particular limits unless those limits are expressly stated in the claims. Further, Units and round number gift amounts are easy to use. However, the invention is not restricted to their use. Basing amounts on Units of a $100 provides simplicity and is readily comprehendible, but are not required. However, various other methods of determining the gift amount could be used.

The amount of the gift payment can be input directly into computer 14, or the number of units can be input into computer 14 and it will determining what the gift amounts would be based on the number of units. In other words, the conversion from units to dollars may be made before or after information is entered into the computer.

D. Calculating Premiums

Those skilled in actuarial science understand that there are many ways to compute premiums. Numerous assumptions and factors are considered such as age, mortality, persistency (what percentage of persons will not complete paying for premiums), operating expenses, interest earned on the asset, and desired profit. Accordingly, different insurance companies charge different premiums for insurance.

An insured could pay for the insurance of the present invention with a single premium or over a term of years or under a continuous pay plan. Appendix 1 provides Table 1, which is an example of a premium table. Table 1 is only an example in that the numbers may change as assumptions and factors change. Table 1 was developed with the understanding that the only persons eligible were those between 45–85 years old at the time of issuance of the policy. Also, Table 1 was developed with the assumption that no health questions or medical requirements will be required for applicants for the insurance.

Table 2, below, provides a convenient work sheet with to compute the amount an insured must pay under a single premium plan.

TABLE 2

| Single Premium Worksheet | |
|---|---|
| Total Annual Gift Amount | |
| ÷ $100 = Total Units | |
| Single Premium Per Unit | × |
| Pre-Total | = |
| Number of Gift Recipient/ | + |
| Beneficiaries × $20 | |
| Total Single Premium | = |

Table 3 provides a convenient worksheet with to compute the premiums an insured must pay for other than a single premium plan.

TABLE 3

| Premium Calculation Worksheet for Other Than Single Premium Payment Plans | |
|---|---|
| Total Annual Gift Amount | |
| ÷ $100 = Total Units | |
| Annual Premium Per Unit | × |
| for Premium Payment Plan* | |
| Pre-Total | = |
| Number of Gift Recipient/ | + |
| Beneficiaries × $7 (3-pay) | |
| $4 (5-pay) or $2 (10-pay | |
| and Continuous pay) | |
| Total Annual Premium | = |

* PPP: 3-year Pay, 5-year Pay, 10-year Pay, or Continuous Premium Payment Plans.

For Bank Draft: Divide Total Annual Premium by 12, 4 or 2 for Monthly, Quarterly or Semi-Annual and round up to next penny. For Direct Bill: Multiply Total Annual Premium by 0.09, 0.265, or 0.52 for Monthly, Quarterly or Semi-Annual.

In a preferred embodiment, the amount of each gift payment is set in a premium table. The following examples illustrate the use of Tables 2 and 3.

Example 1: For an annual gift of $500 for ten years to a single beneficiary, a 47 year old male insured would have a single premium of $1,479.15=(5×291.83)+(1×20). The beneficiary would receive $500 on a particular day (for example, his or her birthday) for ten years.

Example 2: For an annual gift of $250 for ten years to three beneficiaries, the 47 year old male insured would have a single premium of 2,188.73=(7.5×291.83) +(3×20). Each of the three beneficiaries would receive $250 on a particular day (for example, their birthday) for ten years.

Example 3: For an annual gift of $250 for ten years to two beneficiaries, a 49 year old female insured would have three annual premiums of $577.45=(5×112.69)+(2×7). Each of the two beneficiaries would receive $250 on a particular day (for example, their birthday) for ten years.

Table 1 provides premiums for annual payments of 10 years. Of course, the invention is not limited to annual payments of 10 years. For example, annual payments of other durations could be chosen. Merely as an example, annual payments for 3, 5, 15, or 20 years could be chosen. There could be a single payment.

Moreover, the invention would not have to be restricted to a single payment per year. For example, a gift payment could be made on the beneficiaries birthday, and on one of another day such as Christmas or Hanukkah. However, in the case in which more than one payment a year is made, the effect on the cash values and reserves would be factored in.

It would be completely impractical for this specification to provide premium tables for all possible options. Further, such would not be necessary because actuaries could fairly easily produce such tables or algorithms for computing premiums based on what is well known in the industry in combination with the description provided herein. Appendix 2, below, provides certain well known actuarial equations for illustrative purposes, although it is believed that one skilled in the art could make and use the invention even if Appendix 2 were not provided with this specification.

Appendix 2 concerns a whole life policy with premiums payable for life, as a single premium or for 3, 5 or 10 years. The policy will be sold in units of monthly income payable 10 years certain. The commuted value is based on 3½% effective annual interest rate. The commuted values of $1 per month benefit for 10 years is 101.68. Reserves are calculated according to the CRVM method and the 1980 CSO Mortality Table (separate male and female values), Age Last Birthday, Curtate Functions, assuming an interest rate of 4.5% a year and are never less than the cash values provided in the policy. Cash values are based on the 1980 CSO Mortality Table (separate male and female values), Age Last Birthday, Curtate Functions, assuming an interest rate of 5.75% a year. The specimen calculations in this memorandum are for $1,000 of commuted value.

E. Additional Information

Those skilled in the art will appreciate various ways in which the present invention may be implemented. Appendix 3 provides detailed information regarding an example of a policy schedule and definitions that may be included in documents with which the invention may be implemented. (Of course, during the life of a patent issuing from this present application, the invention may not be practiced without the permission of the patent owner.) Most of the information in Appendix 2 has no direct relevance to the invention and is therefore provided in an appendix. The invention could be implemented with details differing in detail from those provided in Appendices 2 and 3.

As used herein, the plural form of various words (e.g. beneficiaries, addresses, designated dates, amounts of gifts) does not exclude there being only one beneficiary, only one address, only one designated date, and/or only one amount of a gift.

The invention could include the ability to increase or decrease the gift amount after opening the account.

As used herein, the term "under one embodiment of the invention," does not mean that there is only one embodiment of the invention which has the particular feature. Indeed, there are numerous embodiments of the invention in which the various features are mixed and matched. Accordingly, several embodiments could each have a particular feature.

It is preferable to make constants programmable, but they may be hardwired or set as values in a read only memory.

It is expected that the message and gift payment would be sent simultaneously, but it is within the scope of the invention if they are sent at approximately the same time. As used herein, the term approximately includes simultaneously.

Appendix 4 provides an example of a form for providing beneficiary information.

For convenience, some of the description herein refers to the insured paying premiums or having preferences for different options. It could be, however, that someone other than the insured pays premiums or chooses options.

F.  Appendices

Appendix 1 (Table 1)

| Age Last Birthday | Premiums per Unit of Annual Gift Amount<br>1 Unit = $100 gift per year for 10 years | | | | | | | | | |
|---|---|---|---|---|---|---|---|---|---|---|
| | Continuous Pay | | 10-year Pay | | 5-year Pay | | 3-year Pay | | Single Prem | |
| | Male | Female | Male | Female | Male | Female | Male | Female | Male | Female |
| 45 | 33.19 | 29.14 | 53.76 | 47.19 | 81.61 | 70.14 | 116.04 | 99.01 | 271.99 | 230.07 |
| 46 | 34.36 | 29.93 | 55.46 | 48.48 | 84.52 | 72.33 | 120.15 | 102.25 | 281.76 | 237.90 |
| 47 | 35.60 | 30.76 | 57.25 | 49.81 | 87.55 | 74.59 | 124.41 | 105.61 | 291.83 | 245.99 |
| 48 | 36.93 | 31.66 | 59.11 | 51.22 | 90.68 | 76.95 | 128.81 | 109.09 | 302.22 | 254.37 |
| 49 | 38.34 | 32.61 | 61.05 | 52.68 | 93.94 | 79.41 | 133.38 | 112.69 | 312.92 | 263.05 |

| | | | | | | | | | | |
|---|---|---|---|---|---|---|---|---|---|---|
| 50 | 39.84 | 33.64 | 63.08 | 54.22 | 97.31 | 82.03 | 138.08 | 116.46 | 323.93 | 272.06 |
| 51 | 41.46 | 34.74 | 65.19 | 55.83 | 100.82 | 84.79 | 142.97 | 120.37 | 335.27 | 281.39 |
| 52 | 43.20 | 35.94 | 67.48 | 57.53 | 104.46 | 87.70 | 148.02 | 124.45 | 346.93 | 291.07 |
| 53 | 45.07 | 37.23 | 69.91 | 59.32 | 108.25 | 90.72 | 153.24 | 128.69 | 358.91 | 301.07 |
| 54 | 47.09 | 38.61 | 72.46 | 61.20 | 112.18 | 93.87 | 158.64 | 133.11 | 371.21 | 311.43 |
| 55 | 49.28 | 40.09 | 75.17 | 63.17 | 116.30 | 97.15 | 164.26 | 137.69 | 383.84 | 322.13 |
| 56 | 51.67 | 41.69 | 78.05 | 65.24 | 120.60 | 100.57 | 170.10 | 142.44 | 396.83 | 333.17 |
| 57 | 54.26 | 43.37 | 81.10 | 67.43 | 125.10 | 104.14 | 176.16 | 147.37 | 410.18 | 344.59 |
| 58 | 57.09 | 45.18 | 84.36 | 69.77 | 129.85 | 107.84 | 182.49 | 152.49 | 423.89 | 356.38 |
| 59 | 60.17 | 47.09 | 87.85 | 72.21 | 134.82 | 111.68 | 189.09 | 157.79 | 437.97 | 368.54 |
| 60 | 63.52 | 49.11 | 91.57 | 74.73 | 140.04 | 115.63 | 195.95 | 163.24 | 452.38 | 381.02 |
| 61 | 67.23 | 51.27 | 95.52 | 77.36 | 145.50 | 119.72 | 203.07 | 168.87 | 467.08 | 393.84 |
| 62 | 71.28 | 53.57 | 99.71 | 80.09 | 151.19 | 123.95 | 210.43 | 174.66 | 482.01 | 406.99 |
| 63 | 75.69 | 56.08 | 104.19 | 82.97 | 157.13 | 128.34 | 218.04 | 180.65 | 497.18 | 420.48 |
| 64 | 80.53 | 58.82 | 108.99 | 86.03 | 163.37 | 132.92 | 225.94 | 186.86 | 512.59 | 434.32 |
| 65 | 85.85 | 61.82 | 114.17 | 89.28 | 169.94 | 137.71 | 234.16 | 193.33 | 528.23 | 448.55 |
| 66 | 90.69 | 64.70 | 118.69 | 92.24 | 175.62 | 142.09 | 241.33 | 199.30 | 542.65 | 462.28 |
| 67 | 95.85 | 67.91 | 123.43 | 95.36 | 181.43 | 146.60 | 248.59 | 205.44 | 557.10 | 476.31 |
| 68 | 101.31 | 71.38 | 128.35 | 98.64 | 187.34 | 151.26 | 255.91 | 211.74 | 571.52 | 490.69 |
| 69 | 107.07 | 75.16 | 133.44 | 102.14 | 193.30 | 156.10 | 263.23 | 218.24 | 585.83 | 505.42 |
| 70 | 113.11 | 79.27 | 138.69 | 105.87 | 199.29 | 161.13 | 270.51 | 224.93 | 599.98 | 520.46 |
| 71 | 119.42 | 83.74 | 144.06 | 109.85 | 205.22 | 166.36 | 277.66 | 231.81 | 613.91 | 535.80 |
| 72 | 126.07 | 88.62 | 149.62 | 114.15 | 211.16 | 171.79 | 284.71 | 238.89 | 627.59 | 551.36 |
| 73 | 133.10 | 93.96 | 155.39 | 118.78 | 217.09 | 177.43 | 291.67 | 246.13 | 641.01 | 567.06 |
| 74 | 140.56 | 99.81 | 161.41 | 123.76 | 223.07 | 183.27 | 298.55 | 253.51 | 654.18 | 582.84 |
| 75 | 148.47 | 106.16 | 167.70 | 129.09 | 229.06 | 189.29 | 305.31 | 261.00 | 667.04 | 598.60 |
| 76 | 153.02 | 110.32 | 169.61 | 131.07 | 232.02 | 192.42 | 305.61 | 262.50 | 681.75 | 615.74 |
| 77 | 164.40 | 118.91 | 179.12 | 138.43 | 241.04 | 200.37 | 315.12 | 271.74 | 696.30 | 632.93 |
| 78 | 175.79 | 128.36 | 189.46 | 146.48 | 250.56 | 208.79 | 324.94 | 281.33 | 710.66 | 650.07 |
| 79 | 190.24 | 138.66 | 200.67 | 155.22 | 260.56 | 217.65 | 335.03 | 291.20 | 724.78 | 667.05 |
| 80 | 204.83 | 149.94 | 212.78 | 164.69 | 271.05 | 226.98 | 345.37 | 301.36 | 738.61 | 683.82 |
| 81 | 210.36 | 155.72 | 215.52 | 167.84 | 274.76 | 231.05 | 345.43 | 302.88 | 752.10 | 700.26 |
| 82 | 226.31 | 168.21 | 230.84 | 178.15 | 285.88 | 240.88 | 355.82 | 313.10 | 765.23 | 716.28 |
| 83 | 243.81 | 181.73 | 248.69 | 189.23 | 297.76 | 251.10 | 366.61 | 323.49 | 778.03 | 731.81 |
| 84 | 263.10 | 196.41 | 268.36 | 201.14 | 310.53 | 261.78 | 377.91 | 334.06 | 790.52 | 746.84 |
| 85 | 284.33 | 212.36 | 290.02 | 216.61 | 324.25 | 272.90 | 389.74 | 344.80 | 802.66 | 761.36 |

Appendix 2

Definitions:

x - issue age $p^1$ - first year net premium $p^2$ - renewal net premium $\beta^F$ - full preliminary term net premium $P^{NL}$ - net level premium $_{19}P_{x+1}$ - 20 pay life full preliminary term net premium for same benefits $\beta^{Com}$ - Commissioner's reserve valuation net premium $p^a$ - adjusted premium $_tI$ - amount of insurance during policy year t (1,000 all years)

AA - average amount of insurance during first 10 policy years

NNLP - nonforfeiture net level premium $_tCV$ - cash value per unit at end of year t $_tV$ - terminal reserve per unit at end of year t $_tPVB_x$ - present value of benefits at end of year t $$_tPVB_x = \frac{1000 \cdot M_{x+t}}{D_{x+t}}$$

Specimen Calculation Male Issue Age 50 - Premiums Payable for Life:

Whole Life Reserves:

$$p^1 = \frac{1000 \cdot C_{50}}{D_{50}} = 6.69937$$

$$p^2 = \frac{_1PVB_{50}}{N_{51} \div D_{51}} = 26.00550$$

$$_1V_{50} = {_1PVB_{50}} - \frac{p^2 \cdot N_{51}}{D_{51}} = 0.00$$

$$_2V_{50} = {_2PVB_{50}} - \frac{p^2 \cdot N_{52}}{D_{52}} = 19.69$$

$$_3V_{50} = {_3PVB_{50}} - \frac{p^2 \cdot N_{53}}{D_{53}} = 39.75$$

$$_{10}V_{50} = {_{10}PVB_{50}} - \frac{p^2 \cdot N_{60}}{D_{60}} = 188.62$$

Cash Values:

$$NNLP = \frac{_0PVB_{50}}{(N_{50}+D_{50})} = 22.03404$$

$$AA = 1,000$$

$$p^a = \frac{_0PVB_{50} + .01 \cdot AA + 1.25 \cdot NNLP}{(N_{50}+D_{50})} = 24.90257$$

$$_1CV_{50} = {_1PVB_{50}} - \frac{p^a \cdot N_{51}}{D_{51}} = -20.50$$

5
$$_2CV_{50} = {_2PVB_{50}} - \frac{p^a \cdot N_{52}}{D_{52}} = -3.00$$

$$_3CV_{50} = {_3PVB_{50}} - \frac{p^a \cdot N_{53}}{D_{53}} = 14.94$$

$$_{10}CV_{50} = {_{10}PVB_{50}} - \frac{p^a \cdot N_{60}}{D_{60}} = 151.89$$

Specimen Calculation Male Issue Age 50 - Premiums Payable for Life:
Reduced Paid Up Insurance:

10
$$_1RPU = \frac{_1CV_{50} \cdot {_1I}}{_1PVB_{50}} = 0$$

$$_2RPU = \frac{_2CV_{50} \cdot {_2I}}{_2PVB_{50}} = 0$$

$$_3RPU = \frac{_3CV_{50} \cdot {_3I}}{_3PVB} = 47$$

$$_{10}RPU = \frac{_{10}CV_{50} \cdot {_{10}I}}{_{10}PVB} = 364$$

Specimen Calculation Male Issue Age 50 - Premiums payable for 3 years:

Life Reserves:

$$_{19}P_{x+1} = \frac{_1PVB_{50}}{[(N_{51} - N_{70}) \div D_{51}]} = 31.53748$$

$$\beta^F = \frac{_1PVB_{50}}{[(N_{51} - N_{53}) \div D_{51}]} = 193.12434$$

$$P^{NL} = \frac{_0PVB_{50}}{[(N_{50} - N_{53}) \div D_{50}]} = 127.77209$$

$$\beta^{Com} = P^{NL} + \frac{_{19}P_{50+1} - _1I \cdot c_{50}}{[(N_{50} - N_{53}) \div D_{50}]} = 136.47922$$

$\beta^F > {_{19}P_{x+1}}$ therefore $p^2 = \beta^{Com}$ $$p^1 = \beta^{Com} - ({_{19}P_{x+1}} - {_1I \cdot c_x}) = 111.64110$$

$$_1V_{50} = {_1PVB_{50}} - \frac{p^2 \cdot (N_{51} - N_{53})}{D_{51}} = 110.44$$

$$_2V_{50} = {_2PVB_{50}} - \frac{p^2 \cdot (N_{52} - N_{53})}{D_{52}} = 252.32$$

$$_3V_{50} = {_3PVB_{50}} = 401.31$$

$$_{10}V_{50} = {_{10}PVB_{50}} = 494.12$$

Cash Values:

$$NNLP = \frac{_0PVB_{50}}{[(N_{50} - N_{53}) \div D_{50}]} = 102.25430$$

$AA = 1,000$ $$p^a = \frac{_0PVB_{50} + .01 \cdot AA + 1.25 \cdot NNLP}{[(N_{50} - N_{53}) \div D_{50}]} = 123.52944$$

$$_1CV_{50} = {_1PVB_{50}} - \frac{p^a \cdot (N_{51} - N_{53})}{D_{51}} = 60.61$$

$$_2CV_{50} = {_2PVB_{50}} - \frac{p^a \cdot (N_{52} - N_{53})}{D_{52}} = 188.53$$

$$_3CV_{50} = {_3PVB_{50}} = 324.37$$

$$_{10}CV_{50} = {_{10}PVB_{50}} = 418.31$$

Specimen Calculation Male Issue Age 50 - Premiums payable for 3 years:

Reduced Paid Up Insurance:

$$_1RPU = \frac{_1CV_{50} \cdot {_1I}}{_1PVB_{50}} = 202$$

$$_2RPU = \frac{_2CV_{50} \cdot {_2I}}{_2PVB_{50}} = 605$$

$$_3RPU = \frac{_3CV_{50} \cdot {_3I}}{_3PVB} = 1000$$

$$_{10}RPU = \frac{_{10}CV_{50} \cdot {_{10}I}}{_{10}PVB} = 1000$$

Specimen Calculation Male Issue Age 50 - Premiums payable for 5 years:

Life Reserves:

$$_{19}P_{x+1} = \frac{_1PVB_{50}}{[(N_{51} - N_{70}) \div D_{51}]} = 31.53748$$

$$\beta^F = \frac{{}_1PVB_{50}}{[(N_{51} - N_{55}) \div D_{51}]} = 101.61742$$

$$P^{NL} = \frac{{}_0PVB_{50}}{[(N_{50} - N_{55}) \div D_{50}]} = 80.62207$$

$$\beta^{Com} = P^{NL} + \frac{{}_{19}P_{50+1} - {}_1I \cdot c_{50}}{[(N_{50} - N_{55}) \div D_{50}]} = 86.11612$$

$\beta^F > {}_{19}P_{x+1}$ therefore $p^2 = \beta^{Com}$

5  $\quad p^1 = \beta^{Com} - ({}_{19}P_{x+1} - {}_1I \cdot c_x) = 61.27800$ $${}_1V_{50} = {}_1PVB_{50} - \frac{p^2 \cdot (N_{51} - N_{55})}{D_{51}} = 57.44$$

$${}_2V_{50} = {}_2PVB_{50} - \frac{p^2 \cdot (N_{52} - N_{55})}{D_{52}} = 143.48$$

$${}_3V_{50} = {}_3PVB_{50} - \frac{p^2 \cdot (N_{53} - N_{55})}{D_{53}} = 233.54$$

${}_{10}V_{50} = {}_{10}PVB_{50} = 494.12$

10  Cash Values:

$$NNLP = \frac{{}_0PVB_{50}}{[(N_{50} - N_{55}) \div D_{50}]} = 65.23225$$

$AA = 1,000$ $$p^a = \frac{{}_0PVB_{50} + .01 \cdot AA + 1.25 \cdot NNLP}{[(N_{50} - N_{55}) \div D_{50}]} = 78.80462$$

17

$$_1CV_{50} = {}_1PVB_{50} - \frac{P^a \cdot (N_{51} - N_{55})}{D_{51}} = 12.98$$

$$_2CV_{50} = {}_2PVB_{50} - \frac{P^a \cdot (N_{52} - N_{55})}{D_{52}} = 90.11$$

$$_3CV_{50} = {}_3PVB_{50} - \frac{P^a \cdot (N_{53} - N_{55})}{D_{53}} = 171.73$$

$$_{10}CV_{50} = {}_{10}PVB_{50} = 418.31$$

Specimen Calculation Male Issue Age 50 - Premiums payable for 5 years:
Reduced Paid Up Insurance:

$$_1RPU = \frac{{}_1CV_{50} \cdot {}_1I}{{}_1PVB_{50}} = 44$$

$$_2RPU = \frac{{}_2CV_{50} \cdot {}_2I}{{}_2PVB_{50}} = 289$$

$$_3RPU = \frac{{}_3CV_{50} \cdot {}_3I}{{}_3PVB} = 530$$

$$_{10}RPU = \frac{{}_{10}CV_{50} \cdot {}_{10}I}{{}_{10}PVB} = 1000$$

Specimen Calculation Male Issue Age 50 - Premiums payable for 10 years
Life Reserves:

$$_{19}P_{x+1} = \frac{{}_1PVB_{50}}{[(N_{51} - N_{70}) \div D_{51}]} = 31.53748$$

$$\beta^F = \frac{{}_1PVB_{50}}{[(N_{51} - N_{60}) \div D_{51}]} = 51.33293$$

$$P^{NL} = \frac{{}_0PVB_{50}}{[(N_{50} - N_{60}) \div D_{50}]} = 45.73266$$

$$\beta^{Com} = P^{NL} + \frac{{}_{19}P_{50+1} - {}_1I \cdot c_{50}}{[(N_{50} - N_{60}) \div D_{50}]} = 48.84915$$

$$\beta^F > {}_{19}P_{x+1} \text{ therefore } p^2 = \beta^{Com}$$

$$p^1 = \beta^{Com} - ({}_{19}P_{x+1} - {}_1I \cdot c_x) = 24.01103$$

5
$$\quad {}_1V_{50} = {}_1PVB_{50} - \frac{p^2 \cdot (N_{51} - N_{60})}{D_{51}} = 18.22$$

$$\quad {}_2V_{50} = {}_2PVB_{50} - \frac{p^2 \cdot (N_{52} - N_{60})}{D_{52}} = 62.93$$

$$\quad {}_3V_{50} = {}_3PVB_{50} - \frac{p^2 \cdot (N_{53} - N_{60})}{D_{53}} = 109.39$$

$$\quad {}_{10}V_{50} = {}_{10}PVB_{50} = 494.12$$

Cash Values:

10
$$\quad NNLP = \frac{{}_0PVB_{50}}{[(N_{50} - N_{60}) \div D_{50}]} = 37.94909$$

$$AA = 1,000$$

$$p^a = \frac{{}_0PVB_{50} + .01 \cdot AA + 1.25 \cdot NNLP}{[(N_{50} - N_{60}) \div D_{50}]} = 45.50750$$

$$\quad {}_1CV_{50} = {}_1PVB_{50} - \frac{p^a \cdot (N_{51} - N_{60})}{D_{51}} = -19.74$$

$$_2CV_{50} = {_2PVB_{50}} - \frac{p^a \cdot (N_{52} - N_{60})}{D_{52}} = 19.75$$

$$_3CV_{50} = {_3PVB_{50}} - \frac{p^a \cdot (N_{53} - N_{60})}{D_{53}} = 61.19$$

$$_{10}CV_{50} = {_{10}PVB_{50}} = 418.31$$

Specimen Calculation Male Issue Age 50 - Premiums payable for 10 years
Reduced Paid Up Insurance:

$$_1RPU = \frac{_1CV_{50} \cdot {_1I}}{_1PVB_{50}} = 0$$

$$_2RPU = \frac{_2CV_{50} \cdot {_2I}}{_2PVB_{50}} = 64$$

$$_3RPU = \frac{_3CV_{50} \cdot {_3I}}{_3PVB} = 189$$

$$_{10}RPU = \frac{_{10}CV_{50} \cdot {_{10}I}}{_{10}PVB} = 1000$$

Specimen Calculation Male Issue Age 50 - Premiums payable for 1 year:
Life Reserves:

$$_1V_{50} = {_1PVB_{50}} = 376.52$$

$$_2V_{50} = {_2PVB_{50}} = 388.80$$

$$_3V_{50} = {_3PVB_{50}} = 401.31$$

$$_{10}V_{50} = {_{10}PVB_{50}} = 494.12$$

Cash Values:

$$_1CV_{50} = {_1PVB_{50}} = 300.06$$

$$_2CV_{50} - {_2PVB_{50}} = 312.06$$

$$_3CV_{50} - {_3PVB_{50}} = 324.37$$

$$_{10}CV_{50} - {_{10}PVB_{50}} = 418.31$$

Accidental Death Reserves:

$$_1V_{50} - {_1PVB_{50}^{ad}} = 13.35$$

$$_2V_{50} - {_2PVB_{50}^{ad}} = 13.57$$

$$_3V_{50} - {_3PVB_{50}^{ad}} = 13.81$$

$$_{10}V_{50} - {_{10}PVB_{50}^{ad}} = 15.76$$

Appendix 3

POLICY SCHEDULE

| | |
|---|---|
| Insured: I. M. Policyowner 123456 | Policy Number: |
| Age: 50 03/06/95 | Effective Date: |
| Sex: Male NONE | Endorsements: |
| Policyowner: Insured Continuous Pay Alternate Payor: Jane Doe | Premium Plan: |

Beneficiary (Gift Recipient): Shown on Application unless changed by Policyowner

| Total Annual Gift Amount | Duration of Gift Payments |
|---|---|
| $1000.00 | 10 Years |

PREMIUMS

| Annual | Semi-Annual | Quarterly | Monthly | Bank Draft Monthly |
|---|---|---|---|---|
| $XXXX.XX | $XXXX.XX | $XXXX.XX | $XXXX.XX | $XXXX.XX |

GUARANTEED VALUES FOR EACH $1,000.00 OF COMMUTED VALUE

| Policy Year | Total Annual Gift Amount | Cash Value | Paid Up Insurance |
|---|---|---|---|
| 1 | $1000.00 | $0.00 | $0.00 |
| 2 | $1000.00 | $0.00 | $0.00 |
| 3 | $1000.00 | $14.94 | $47.00 |
| 4 | $1000.00 | $33.30 | $99.00 |
| 5 | $1000.00 | $52.07 | $149.00 |
| 6 | $1000.00 | $71.21 | $197.00 |
| 7 | $1000.00 | $90.76 | $242.00 |
| 8 | $1000.00 | $110.72 | $284.00 |
| 9 | $1000.00 | $131.11 | $325.00 |
| 10 | $1000.00 | $151.89 | $364.00 |
| 11 | $1000.00 | $173.07 | $400.00 |
| 12 | $1000.00 | $194.56 | $435.00 |
| 13 | $1000.00 | $216.32 | $468.00 |
| 14 | $1000.00 | $238.27 | $499.00 |
| 15 | $1000.00 | $260.35 | $529.00 |
| 16 | $1000.00 | $282.56 | $557.00 |
| 17 | $1000.00 | $304.89 | $583.00 |
| 18 | $1000.00 | $327.37 | $608.00 |
| 19 | $1000.00 | $350.00 | $632.00 |
| 20 | $1000.00 | $372.74 | $655.00 |

The Guaranteed Values of this policy are calculated with the Standard Nonforfeiture Law for Life Insurance. The values are for a policy with no outstanding Policy Loan. Values for any year not shown will be furnished upon request.

Reserves are calculated using the Commissioner's Reserve Valuation Method and the 1980 CSO Mortality Table. The annual interest rate for the Reserve calculation is 4.5%. The annual interest rate for Cash Value calculation is 5.75%.

The maximum interest rate to determine a commuted value is no greater than the greater of the current yield on 90 day treasury bills or the Policy Loan Interest rate. The annual Policy Loan Interest rate is 8%, accruing daily. The annual interest rate for Reinstatement of the policy is 5% compounded.

DEFINITIONS

| | | |
|---|---|---|
| Effective Date | | The date this policy takes effect, as shown on the Policy Schedule. |
| Insured | | The person whose life is insured under this policy, as shown on the Policy Schedule. |
| Annual Gift Amount | | The total amount of annual gift payments shown on the Policy Schedule or any endorsement to the Policy Schedule. |
| Gift Payments | | The amounts the insurer (e.g. insurance company) are obligated to pay under the terms of this policy when the Insured dies. |
| Beneficiary (Gift Recipient) | | The person or persons chosen to receive the Gift Payments under this policy. |
| Age | | The Insured's age as of their last birthday. |
| Cash Value | | The amount shown in a table on the Policy Schedule for the Insured's age and sex at issue. |
| Cash Surrender Value | | The Cash Value less any Indebtedness. |
| Indebtedness | | Unpaid policy loans and policy loan interest. |
| Loan Value | | An amount which, with accrued interest, equals the Cash Value on the next premium due date or the next Policy Anniversary, if earlier, less any Indebtedness. |
| Policy Month | | A period beginning each month on the day of the Effective Date and ending the next month on the day preceding the day of the Effective Date. |
| Policy Anniversary | | The same day and month as the Effective Date of this policy for each succeeding year this policy stays in force. |
| Policy Year | | A period of 12 months beginning each year on the month and | day of the Effective Date.

GIFT PAYMENTS

| | | |
|---|---|---|
| 5 | Annual Gift Payments | If the Insured dies while this policy is in force, the insurer will pay each Beneficiary (Gift Recipient) the Annual Gift Amount selected, on annual specified dates, in 10 annual Gift Payments. |
| 10 | | The Annual Gift Amount selected and the dates of annual Gift Payments for each Beneficiary are shown on the application, which is attached to this policy. |
| 15 | | The total number of Gift Payments will be reduced as a result of any Indebtedness, amounts in force as reduced Paid-Up Insurance and any premium due and unpaid at the Insured's death. In these situations, Gift Payments will be made to each Beneficiary in the Annual Gift Amount originally selected until the total amount available has been paid. |
| 20 | | |

OWNERSHIP AND BENEFICIARY

| | | |
|---|---|---|
| 25 | Policyowner | The insured (named on the policy) is the owner of this policy, unless stated otherwise in the application, or later changed by the insured. As Policyowner, the insured can exercise all rights under this policy while the insured is alive. The insured can change ownership if the insured sends the insurer a written request to do so. If a new Policyowner is named, any earlier ownership designations will be void, unless specified otherwise. |
| 30 | | |
| 35 | Beneficiary | The Beneficiary is the person or persons named by the Policyowner to receive the Gift Payments (Gift Recipient) when the Insured dies. If no Beneficiary is alive when the Insured dies, the Beneficiary will be the Insured's estate. |
| 40 | | In the event a Beneficiary dies before the Insured, the Gift Payments of that deceased Beneficiary will be divided among the surviving Beneficiaries proportionately to the amount each surviving Beneficiary is to be paid. |
| | | In the event a Beneficiary dies during the gift payment period, insurer will commute the remaining gift payments to present value, using the interest rate shown on the Policy Schedule, and pay a lump sum to that Beneficiary's estate. |

| | | |
|---|---|---|
| | Change | To change the Policyowner or Beneficiary, send the insurer a written request to do so while the Insured is alive. A change will not take effect until it is recorded at the insurer's the insurer's home office and attached to the policy. The change will not apply to any payment made by the insurer before the insurer recorded the insured's request. |
| | Assignment | The insurer will not be bound by any assignment unless it is in writing, signed by the Policyowner, and recorded at the insurer's home office. The insurer are not responsible for the validity of any assignment. Any amount to be paid to an assignee will be commuted to present value, and paid in a lump sum. Any claim made by an assignee will be subject to proof of their interest and the extent of the assignment. |

PREMIUMS AND REINSTATEMENT

| | | |
|---|---|---|
| | Premium Payments | Premiums must be paid to the insurer at the insurer's home office. The insured may pay the first premium to the insurer at the insurer's home office or to the insured's agent. A receipt for a premium payment will be given to the insured at the insured's request. |
| | | The first premium must be paid no later than the date this policy is delivered. There is no insurance unless this premium is paid while all statements and answers on the application remain correct. |
| | | Renewal premiums are paid according to the payment interval the insured chooses. Each renewal premium due after the first premium must be paid on or before its due date. The due dates of renewal premiums are measured from the Effective Date of the policy. |
| | Grace Period | The insured has 31 days from the premium due date to pay each renewal premium. If the insured does not pay the premium due by the end of the Grace Period, this policy will terminate on the day after the Grace Period ends, subject to Nonforfeiture Options. This policy will stay in force during the Grace Period. |
| | | If the Insured dies during the Grace Period, the insurer will pay the benefits, minus the premium needed to cover the period from the beginning of the Grace Period to the end of the Policy Month in which the Insured died. |

| | | |
|---|---|---|
| | Conservation | The insured has an additional 15 days beyond the Grace Period to pay the premium. |
| | Period | During this 15 day extension, this policy is not in force unless the premium is paid within this period and while the insured is alive. This policy will then be automatically renewed with no lapse in coverage. |
| | Alternate Payor | The insured has the right to select a person to receive a reminder of the renewal premium due if not paid during the Grace Period. The insured's Alternate Payor, if selected, is shown on the Policy Schedule. |
| | Reinstatement | If the Grace Period has ended without payment of the renewal premium and this policy has terminated, the insured may apply to reinstate it. To reinstate this policy the insured must: | a) apply in writing within 5 years after the end of the Grace Period; and
    b) pay all past due premiums plus 5% interest compounded per year, from their due dates to the date of reinstatement; and
    c) pay or reinstate any Indebtedness, at the rate of 5% interest compounded per year.

The date of reinstatement will be the first day of the month on or next following the date the insurer approve the insured's application for reinstatement. When this policy is reinstated, the 2 year contestability period will apply with respect to statements made in the application for reinstatement. This policy will not be reinstated if it has been surrendered.

| | | |
|---|---|---|
| | Basis of Reserves | Amounts held as reserves for this policy equal or exceed those required by law and are computed by the insurer according to sound and accepted actuarial principles. The method of computing the insurer's reserves is filed with the insurance regulatory agency in each state where this policy is available. |

SURRENDER BENEFITS AND NONFORFEITURE OPTIONS

| | | |
|---|---|---|
| | Surrender of Policy | While this policy is in force, the Policyowner may surrender it for its Cash Surrender Value by sending the insurer a written request and the policy. The date of surrender will be the date the insurer receives the request and policy, or later if indicated. All coverage under this policy will end on that date. The Cash |

| | | |
|---|---|---|
| | | Surrender Value will be determined from the date of surrender. If the policy is surrendered within 30 days after the due date of an unpaid premium, the Cash Surrender Value will not be less than the value on that premium due date. |
| | Nonforfeiture Options | If this policy has Cash Surrender Value, one of the following options may be chosen by sending the insurer a written request made within 60 days after the due date of an unpaid premium and before the Insured's death. The options available are:<br>(1) Paid-Up insurance -- This policy is continued from the due date of the unpaid premium at a reduced amount of paid-up life insurance. The amount of coverage will be that which the Cash Surrender Value will provide when applied as a net single premium at the Insured's attained Age on the due date of the unpaid premium.<br>(2) Cash Surrender -- This policy ends and is surrendered in accordance with the Surrender of Policy provision stated above. |
| | Automatic Option | If no option is chosen, the automatic option will be Paid-Up Insurance, if available; otherwise it will be a Cash Surrender. |
| | Surrender of Paid-Up Insurance | Paid-up insurance may be surrendered for a Cash Surrender Value. The Cash Value of Paid-Up Insurance will be the net single premium at the attained Age of the Insured on the surrender date. If the insurance is surrendered within 30 days after a Policy Anniversary, the Cash Surrender Value will not be less than that on that anniversary. The date of surrender will be the date the insurer receives a written request for surrender at the insurer's home office. The insurer may request the policy be sent with the insured's written request. |
| | Deferral of Payment | The insurer may delay paying Surrender Benefits for up to 6 months from the date of surrender. If the insurer delays for 30 days or more, interest will be paid at an annual rate of 5.75% per year or any higher rate the insurer declares. During this period this policy remains in force. |
| | Endorsements | Any additional benefit endorsements attached to the policy are disregarded in computing values of the Nonforfeiture Options. Insurance provided under Nonforfeiture Options will not include such benefits. |

| | | |
|---|---|---|
| 5 | Basis of Values | The mortality and interest basis of policy values for the guaranteed Cash Values and Paid-Up Insurance are shown on the Policy Schedule. All policy values equal or exceed the requirements of each state in which this policy is available. The insurer's method of computing policy values is filed with the insurance regulatory agency of each such state. |

LOANS

| | | |
|---|---|---|
| 10 | Policy Loans | The Policyowner may obtain a policy loan by sending the insurer a written request. The policy will be assigned to the insurer as the only security needed. The most that can be borrowed at any time is the Loan Value. |
| 15<br><br>20 | Automatic Premium Loan | If any renewal premium remains unpaid after the end of the Conservation Period, the insurer will automatically pay the premium due to the next Policy Anniversary and charge it as a loan against the policy if:<br>• the Policyowner requested an automatic premium loan on the application or by a written request recorded by Us; and<br>• the resulting loan and loan interest does not exceed the Loan Value. |
| 25 | | If the maximum Loan Value is less than the amount necessary to pay the premium to the next Policy Anniversary a Nonforfeiture Option can be chosen. |
| 30 | | Interest at the Policy Loan Interest rate will be charged from the premium due date. These loans will be subject to the same terms and conditions as other policy loans. Automatic premium loan may be canceled at the written request of the Policyowner. |
| 35 | Policy Loan Interest | The loan interest rate for a policy loan is 8%. Interest will accrue daily and will be due the end of each Policy Year. Interest not paid when due will be added to the amount of the loan as of the due date and will itself bear interest at the rate of 8%. |
| 40 | Repayment of Policy Loans | Outstanding loans and policy loan interest may be repaid at any time before the Insured dies or within 60 days after the Insured's death if:<br>• no payment has been paid; and |

|   |   |   |
|---|---|---|
|   |   | • the policy is in force with no premium due, or is in force as Paid-Up Insurance. |
| 5  10 | Termination Deferral of Policy Loans | This policy will terminate if all outstanding Policy Loans and Policy Loan Interest exceed the Cash Value. The insurer may delay any Policy Loan for up to 6 months from the date the insurer receive a written request. If the insurer delays for 30 days or more, interest will be paid at an annual rate of 5.75% or any higher rate the insurer declares. The insurer will not defer payment of any loan if the amount is to be used to pay a premium to Us. |

GENERAL PROVISIONS

|   |   |   |
|---|---|---|
| 15  20 | Entire Contract | The entire contract consists of this policy, the attached application, any supplemental applications and any endorsements attached to this policy. All statements in the application will be considered representations and not warranties. No statements will be used to void this policy, or to contest a claim under it, unless it appears in the attached application. |
| 25 | Changes or Modifications | No agent has the authority to modify, change or waive any provision of this policy. A modification or change will only be valid if it is in writing and approved by the insurer's President or Secretary. The insurer requests the insured to submit this policy for endorsement to show any change. |
| 30 | Incontestability life Period | The insurer will not contest this policy after it has been in force during the Insured's for 2 years from the Effective Date. If this policy is reinstated, this provision will be measured from the reinstatement date. |
| 35 | Suicide | If the Insured dies by suicide, while sane or insane, within 2 years from the Effective Date, the insurer will pay an amount equal to the premiums paid on this policy to the Insured's estate. If the law of the state where this policy is issued provides a shorter time period, that law will govern. |
| 40 | Misstatement of Age or Sex | If the Insured's Age or sex is misstated in the application, the Annual Gift Amount will be adjusted. The adjusted amount will be the Annual Gift Amount the premium paid would have provided based on the Insured's correct Age or sex. |

| | |
|---|---|
| Protection of Payments | Unless agreed to by Us, or otherwise provided in this policy, no one entitled to receive benefits under this policy may commute, pledge, sell or assign any part of such benefits. To the extent permitted by law, benefits will not be subject to the claims of any Beneficiary's creditors. |
| Nonparticipation | This policy does not participate in the distribution of the insurer's surplus or profits. No dividends are payable under this policy. |

Appendix 4

| Proposed Insured Name (First/Middle/Last) | | | | | |
|---|---|---|---|---|---|
| Gift Recipients/Beneficiaries (First/MI/Last) | Address (Street/City/State/Zip) | Relationship to You | Gift Occasion | Date to be Paid | Annual Gift Amount |
| | | | | | $ |
| | | | | | $ |
| | | | | | $ |
| | | | | | $ |
| | | | | | $ |

Dated at (City and State) _____ this ___ Day of _____ 19___

Signed (Proposed Insured) _____

Signed (Owner, if not Insured) _____ Relationship _____

Signed (Agent) _____

G. Conclusions

The present invention may be embodied in specific forms other than those of the preceding description, which are to be considered only as illustrative and not restrictive. Accordingly, the scope of the invention is indicated by the following claims, including equivalents thereof, rather than by the specific embodiments described in the preceding description. Unless details are specifically mentioned in a claim, they are not to be considered part of the invention of the claim.

What is claimed is:

1. A system for enabling delivery of insurance gift payments that an insurer is to make to designated beneficiaries on behalf of insureds, the system comprising:

input means for receiving at least information regarding at least one insured, at least one insurance gift plan, at least one occasion or date to send each gift, at least one message to send with the gift, and at least one beneficiary, said input means associated with means for entering received information into a storage device, and for accessing and modifying information stored in said storage device;

calculating and formatting means, responsive to said input means, for processing stored information, and creating insurance plan tables and schedules;

processing means, responsive to the calculating and formatting means, for determining an amount for each gift payment, and, after the insured has died, determining when each message and gift are to be sent to arrive for the occasion or date; and output means, responsive to the processing means, for providing information stored in the storage device in formatted form.

2. The system of claim 1 in which the information regarding the insurance gift plan at least includes an amount of the gift, a number of years for payment of the gift, a number of beneficiaries, and how often the gift is to be paid to each beneficiary.

3. The system of claim 2 in which the amount of the gift is in the form of a number of units, and the processing means determines the amount based on the number of units.

4. The system of claim 2 in which the information regarding the amounts of the gift payments is received in the form of dollars, and the processing means determines a number of units based on the information in memory.

5. The system of claim 1 in which the information regarding the at least one beneficiary includes the name, address, and relation to the insured.

6. The system of claim 1 in which the output means provides the information with enough time to allow for mailing so that the at least one beneficiary receives each gift payment and message at least by the designated occasion or date.

7. The system of claim 6 in which the gift payment is in the form of a check, and the message is in the form of a card.

8. The system of claim 7 in which the check and card are sent by post.

9. The system of claim 1 in which at least a portion of the information provided by the output means is in the form of electronic transmissions.

10. The system of claim 9 in which the electronic transmissions are transmitted over the Internet.

11. The system of claim 1 in which the output means includes a printer for printing media.

12. The system of claim 11 in which the media said printer can print at least includes envelopes, labels, schedules, tables, reports, messages, letters, cards, and checks.

13. The system of claim 1 in which the at least one occasion is an occasion that can occur on a different date each calendar year.

14. The system of claim 1 in which the at least one message corresponds to the occasion or date for which the message is to be sent.

15. The system of claim 1 in which the at least one insurance gift plan has a duration expressed in the form of a number of gift payments.

16. The system of claim 1 in which the information regarding an insured comprises a name, address, sex, and age for the insured, and whether the insured is living.

17. The system of claim 1 in which the processing means is a computer processor, the calculating and formatting means is a computer processor, and the storage device is computer memory.

18. The system of claim 17 in which the computer memory is a hard drive which also includes software or firmware programs.

19. The system of claim 17 in which the computer processors are part of a computer system.

20. The system of claim 1 in which the insurance plan tables and schedules at least include premium tables, policy schedules, and beneficiary lists.

21. The system of claim 1 in which the input means includes a scanner.

22. The system of claim 1 in which said input means involves remote access.

23. The system of claim 1 in which said message is in the form of a video.

24. The system of claim 1 in which the message has text and form chosen by the insured.

25. The system of claim 1 in which the at least one insurance gift plan allows the insured to choose an annual payments duration of 1, 3, 5, 10, 15, or 20 years.

* * * * *